A. HAYES.
METHOD OF DISTILLING.
APPLICATION FILED SEPT. 19, 1919.

1,338,983.  Patented May 4, 1920.

INVENTOR
Albert Hayes
by A. P. Greeley
Attorney

UNITED STATES PATENT OFFICE.

ALBERT HAYES, OF NEW YORK, N. Y., ASSIGNOR TO ARTHUR F. RAY, OF WOBURN, MASSACHUSETTS.

METHOD OF DISTILLING.

1,338,983.  Specification of Letters Patent.  Patented May 4, 1920.

Application filed September 19, 1919. Serial No. 324,921.

*To all whom it may concern:*

Be it known that I, ALBERT HAYES, a citizen of the United States, residing at New York, in the county of New York and State of New York, have invented certain new and useful Improvements in Methods of Distilling, of which the following is a specification.

My invention relates to the distillation from alcohol carrying material of alcohol suitable for use as a basis for and the principal component of a motor fuel adapted for use in explosion engines and for like purposes, more rapidly and with greater economy and more complete exhaustion of the alcohol contained in the material subjected to distillation than heretofore. A further object of the invention is to produce by a single operation a liquid containing alcohol, water and ether, with or without an added denaturing substance, in suitable proportions for use as a motor fuel without subsequent treatment.

In the distillation of alcohol as heretofore carried on the primary object has been to separate the alcohol from the water with which it is mixed in the alcohol carrying material, as completely as possible and, as the boiling point of alcohol is much lower than that of water, the distillation has been carried on at atmospheric pressure and the heat has been so regulated as to avoid heating the material to the temperature at which water boils so as to avoid, as much as possible, vaporizing the water. While for the objects desired, that is as complete a separation of alcohol as possible from water as well as from impurities carried by the material subjected to distillation and which would be objectionable if the alcohol is to be used as a beverage or for other purposes where purity is essential, the methods heretofore practised are, no doubt, satisfactory although necessarily somewhat slow and expensive, such methods are not satisfactory for the purpose of producing a motor fuel for which cheapness of production is of primary importance and purity of the alcohol is not only not important but is not even desirable. It is essential for producing a satisfactory motor fuel to have a considerable proportion of water with the alcohol and it is rather desirable than otherwise that the product carry such impurities as will render the liquid produced unfit for use as a beverage. It is also important that the product be ready for use as a motor fuel without any addition to it or any further treatment.

With the objects above explained in view my invention consists in the method hereinafter described and claimed.

Figure 1:
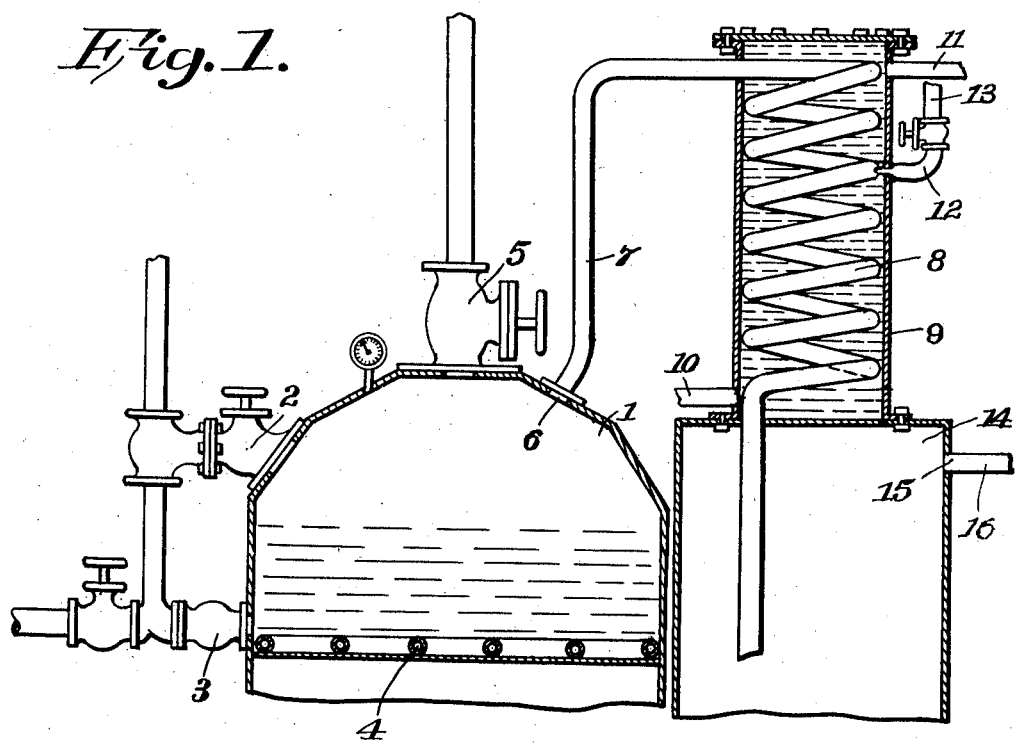
Figure 2:
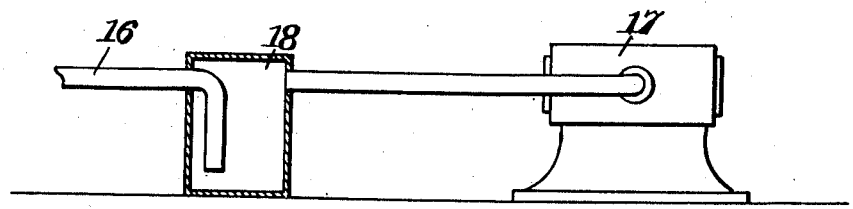

In the drawings which are to be understood as illustrative only and not as in any way restricting the invention to the use of the apparatus shown or to any particular apparatus, Figure 1 is a central longitudinal sectional view of a still and condensing apparatus adapted for carrying out my method and Fig. 2 is a similar view of apparatus for producing a partial vacuum in the apparatus shown in Fig. 1.

Referring to the drawings 1 indicates a still with valve controlled inlet 2 for admitting the alcohol carrying material to be subjected to distillation preferably containing from 20 to 30 per cent. of alcohol by volume, and with valve controlled outlet 3 near its bottom for drawing off the residue remaining after the distillation is complete. The still may be heated by any convenient means preferably heating means adapted to be readily controlled. In the drawings a coil of pipe 4 is shown for this purpose within the still through which steam or hot water may be passed. The still is preferably provided in its top with an air inlet 5 suitably valve controlled for admitting air to break the vacuum as hereinafter described.

6 indicates the vapor outlet arranged near the top of the still. From this vapor outlet a pipe 7 leads to the condensing worm 8 which is shown arranged in the usual cooling tank 9 provided with the water inlet 10 near its bottom and water outlet 11 near its top. At some convenient point in the worm 8 preferably about midway of its length, is arranged an inlet opening 12 connected with a valve controlled pipe 13 leading from a tank (not shown) containing ether with or without a suitable denaturing substance dissolved in or mixed with it. The ether inlet is preferably arranged at a point in the worm at which the vapors from the still are sufficiently cooled to merely warm the ether without vaporizing it.

14 indicates a closed tank into which the lower end of the worm 8 extends. Near the upper end of this tank is an outlet opening 15 connected by pipe 16 with a vacuum pump 17, a trap 18 being preferably interposed between the tank and the vacuum pump.

In carrying out the method of my invention a suitable quantity of alcohol carrying material preferably containing from 20 to 30 per cent. of alcohol by volume or more, is run into the still and heated by the steam coil 4. The vacuum pump is put in operation reducing the pressure in the still and its connections so that water and the higher alcohols contained in the material will be vaporized without carrying the heat above or even up to the temperature at which ethyl alcohol boils (78.4 C.) and will pass off through the vapor outlet 6 and will be condensed in the worm 8. As the vapors more or less completely condensed pass down through the worm the valve of pipe 13 is opened to let a regulated quantity of ether either with or without a suitable denaturing substance, enter and mix with the condensate, the condensate thus mixed with ether passing into the tank 14.

By suitable regulation of the temperature and vacuum practically all of the ethyl alcohol will be extracted from the material subjected to distillation and also substantially all of the higher alcohols which are intended to be left in the residue in the ordinary distillation process so far as possible because their presence tends to render alcohol unfit for use as a beverage or as a basis for a beverage. The amount of these higher alcohols, constituting the so-called fusel oil, which will be carried over into the product will be sufficient to render the product highly objectionable for use as a beverage and will probably be sufficient to render it denatured within the requirements of the Internal Revenue without adding any denaturing substance.

Because of the fact that impurities such as the higher alcohols and extractive matter which would be highly objectionable if alcohol suitable for beverage purposes is desired are not objectionable in a motor fuel, the material subjected to distillation may be any material capable of producing alcohol by fermentation such, for instance, as the waste products from paper manufacture or the waste molasses from the manufacture of sugar from cane or from beets.

The effect of the vacuum is, of course, to greatly lessen the time necessary to carry the distillation to the point of exhausting the material of its alcohol content.

I do not herein claim the apparatus herein shown and described that forming the subject-matter of a separate application for patent filed of even date herewith, Serial No. 324922, nor do I claim herein the product that forming the subject-matter of a separate application for patent also filed of even date herewith, Serial No. 324920.

Having thus described my invention what I claim is;

1. The method of producing an alcohol carrying liquid adapted for use as a motor fuel which consists in distilling alcohol carrying material and adding ether to the vapors during the process of condensation.

2. The method of producing an alcohol carrying liquid adapted for use as a motor fuel at a single operation which consists in distilling alcohol carrying material in a partial vacuum at a temperature below that at which water boils so as to carry over water with the alcohol vapor, and adding ether during the condensing process.

In testimony whereof I affix my signature.

ALBERT HAYES.